United States Patent [19]

Marks

[11] Patent Number: 6,097,390
[45] Date of Patent: *Aug. 1, 2000

[54] PROGRESS-INDICATING MOUSE POINTER

[75] Inventor: Laurence Victor Marks, Raleigh, N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,884

[22] Filed: Apr. 4, 1997

[51] Int. Cl.[7] ........................................ G06F 3/14
[52] U.S. Cl. ........................ 345/348; 345/349; 345/977
[58] Field of Search ..................... 345/348, 349, 345/326, 333, 334, 338, 339, 977, 145, 473

[56] References Cited

U.S. PATENT DOCUMENTS

| | | | |
|---|---|---|---|
| 5,301,348 | 4/1994 | Jaaskelainen | 714/46 |
| 5,319,384 | 6/1994 | Isenberg et al. | 345/145 |
| 5,420,968 | 5/1995 | Johri | 345/433 |
| 5,423,039 | 6/1995 | Matteson | 709/107 |
| 5,448,693 | 9/1995 | Blades et al. | 345/348 |
| 5,479,602 | 12/1995 | Baecker et al. | 345/349 |
| 5,519,390 | 5/1996 | Casini | 340/929 |
| 5,524,195 | 6/1996 | Clanton, III et al. | 345/327 |
| 5,544,295 | 8/1996 | Capps | 345/473 |
| 5,586,237 | 12/1996 | Baecker et al. | 345/473 |
| 5,596,694 | 1/1997 | Capps | 345/473 |
| 5,630,081 | 5/1997 | Rybicki et al. | 345/349 |
| 5,655,093 | 8/1997 | Frid-Nielsen | 345/326 |
| 5,801,692 | 9/1998 | Muzio et al. | 345/339 |
| 5,801,698 | 9/1998 | Lection et al. | 345/347 |
| 5,805,166 | 9/1998 | Hall, Jr. et al. | 345/349 |
| 5,898,432 | 4/1999 | Pinard | 345/334 |
| 5,940,078 | 8/1999 | Nagarajayya et al. | 345/346 |
| 5,953,010 | 9/1999 | Kampe et al. | 345/348 |

OTHER PUBLICATIONS

IBM Technical Disclosure Bulletin V. 37 #12 Dec. 1994. "Icon that Shows Length of Audio or Video", p. 179.

Kenneth Mason Publications Ltd, England, Aug. 1990 #316, "Design of Dynamically Updated Icon to Depict Labor Standard Range".

IBM Technical Disclosure Bulletin V.35 #1A Jun. 1992 "Multi–State Icon", pp. 338–339.

*Primary Examiner*—Crescelle N. dela Torre
*Attorney, Agent, or Firm*—Joscelyn G. Cockburn

[57] ABSTRACT

A method of indicating a state of progress of a task being processed in a computer system by providing a progress-indicating visual pointer on a display device of the computer system. Prior art visual pointers (such as an arrowhead) are responsive to a pointer device such as a mouse, and are used to manipulate features of a graphical user interface (GUI). These prior art pointers do not indicate the state of progress of a task underway, but rather only indicate that the task is still running. The progress-indicating pointer of the present invention can take the form of a wristwatch or clock icon having a face which is filled, e.g., in a clockwise fashion, or the form of an hourglass icon having a portion, e.g., the lower half of the hourglass, which is filled in an amount proportionate to the state of progress of the task being processed. The different states of the icon can easily be presented by providing a plurality of bitmaps (e.g., a 32-by-32 array of pixel elements), and program instructions select one of the bitmaps for the progress-indicating visual pointer based on the state of progress of the task being processed. The progress-indicating pointer may be provided in response to instructions from the operating system or from the application software.

9 Claims, 4 Drawing Sheets

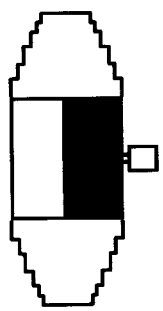 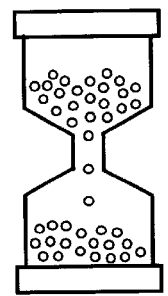 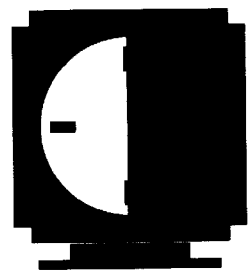
FIG. 6A     FIG. 6B     FIG. 6C
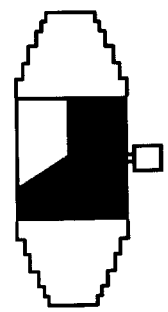 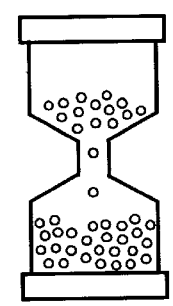 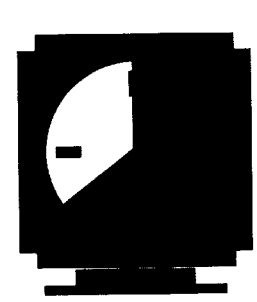
FIG. 7A     FIG. 7B     FIG. 7C
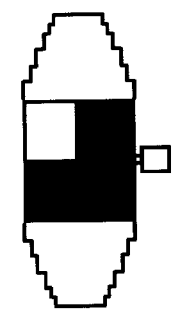 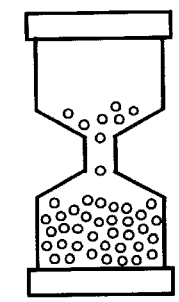 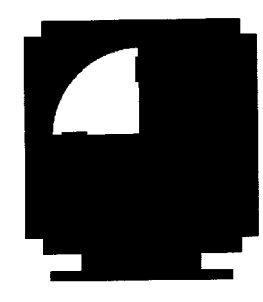
FIG. 8A     FIG. 8B     FIG. 8C

PROGRESS-INDICATING MOUSE POINTER

BACKGROUND OF THE INVENTION

1. Field of the Invention

The present invention generally relates to computer systems and, more particularly, to a progress-indicating pointer in a graphical user interface.

2. Description of the Related Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor, pointing device, and keyboard) for the user interface, a permanent memory device 16 (such as a hard disk or floppy diskette) for storing the computer's operating system and user programs, and a temporary memory device 18 (such as random-access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video-display monitor, and a memory controller may be used as an interface between temporary memory device 18 and processor 12. Computer system 10 also includes firmware 24 whose primary purpose is to seek out and load an operating system from one of the peripherals (usually permanent memory device 16) whenever the computer is first turned on.

Several conventional operating systems provide graphical user interfaces (GUIs) which allow a pointing device, such as a mouse, to manipulate a visual pointer on the display device (video monitor). The visual pointer typically takes the form of an arrowhead, although other shapes are also used, such as crosshairs, a vertical line (caret or I-beam), or a hand. The pointer is used to select text, activate buttons, and perform other operations, such as "drag-and-drop" operations.

Many graphical user interfaces display a different shape or design of the pointer to indicate that a task is in progress and may take some time to complete. Several examples of such pointer designs are shown in FIGS. 2A–2C. FIG. 2A depicts a wristwatch icon, while FIG. 2B depicts an hourglass icon, and FIG. 2C depicts a clock icon. These icons are typically used only when a task will take a short time to complete. They are often static; that is, they do not change shape or appearance while the task is in progress, although some operating systems or user applications allow them to change shape to indicate that the task is still underway. For example, the wristwatch and clock icons of FIGS. 2A and 2C may show one of the hands (e.g., the second hand) moving, and the hourglass of FIG. 2B may be occasionally filled and rotated (inverted), during the task duration. Nevertheless, these icons do not indicate the progress of the task, i.e., how much of the task is completed but, rather, only indicate that the task is still active.

Other than the foregoing change in the design of a pointer icon, most graphical user interfaces standardize on only one other means to indicate to the user that a task is in progress and will take some time to complete. For tasks estimated to be of long duration, a progress window is often painted on the screen. This indicator typically takes the form of a horizontal bar which fills in (from left-to-right) proportionate to the amount of the task completed, as illustrated in FIG. 3.

The first form of a task indicator (FIGS. 2A–2C) is uninformative; the only information the user can perceive about task duration is that it will be less than the amount that the programmer deemed appropriate for use of the second indicator type (FIG. 3). That is, all the user knows is that the wait time will be "short." However, it is not always appropriate to use the second type of indicator for short tasks. It is inappropriate to use the second form of progress indicator (FIG. 3) as the visual impact of window creation and deletion is distracting. Also, the CPU resource consumed by window creation, updating, and deletion may actually be significant relative to the duration of the task itself. It would, therefore, be desirable to provide a resource-sparing indicator that visually informs the user of how much of a task is complete. It would be further advantageous if this indicator were able to provide information on the task progress in an intuitive but non-intrusive (non-distracting) manner.

SUMMARY OF THE INVENTION

It is therefore one object of the present invention to provide an improved method of indicating the progress of a task in a computer system.

It is another object of the present invention to provide such a method that provides the progress indicator in a graphical user interface.

It is yet another object of the present invention to provide such a method that uses a small amount of CPU resources.

The foregoing objects are achieved in a method of indicating a state of progress of a task being processed in a computer system, generally comprising the steps of providing a progress-indicating visual pointer on a display device of the computer system, and dynamically changing an appearance of the progress-indicating visual pointer based on a state of progress of a task being processed by the computer system. A default visual pointer (such as an arrowhead) can be provided during an idle state of the computer system, and the progress-indicating visual pointer is provided only during task execution. The progress-indicating pointer can take the form of a wristwatch or clock icon having a face which is filled, e.g., in a clockwise fashion, or the form of an hourglass icon having a portion, e.g., the lower half of the hourglass, which is filled in an amount proportionate to the state of progress of the task being processed, while the upper half is emptied. The progress-indicating visual pointer preferably dynamically changes between at least three states, although many more states (e.g., twenty states indicating progression in 5% increments) may be employed. The different states of the icon can easily be presented by providing a plurality of bitmaps (e.g., a 32-by-32 array of pixel elements), and causing the operating system to select successive bitmaps for the progress-indicating visual pointer based on the state of progress of the task being processed. The bitmaps may be selected in response to instructions from the operating system itself, or from the application software. The present invention provides an intuitive but non-intrusive indicator which takes a relatively small amount of CPU resources to indicate the state of progress of the task underway.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIGS. 6A–6C are depictions of several embodiments of pointer icons used in accordance with the present invention, to indicate that a task is approximately 50% complete;

FIGS. 7A–7C are depictions of several embodiments of pointer icons used in accordance with the present invention, to indicate that a task is approximately 66% complete; and FIGS. 8A–8C are depictions of several embodiments of pointer icons used in accordance with the present invention, to indicate that a task is approximately 75% complete.

DESCRIPTION OF THE PREFERRED EMBODIMENT

Figure 1:
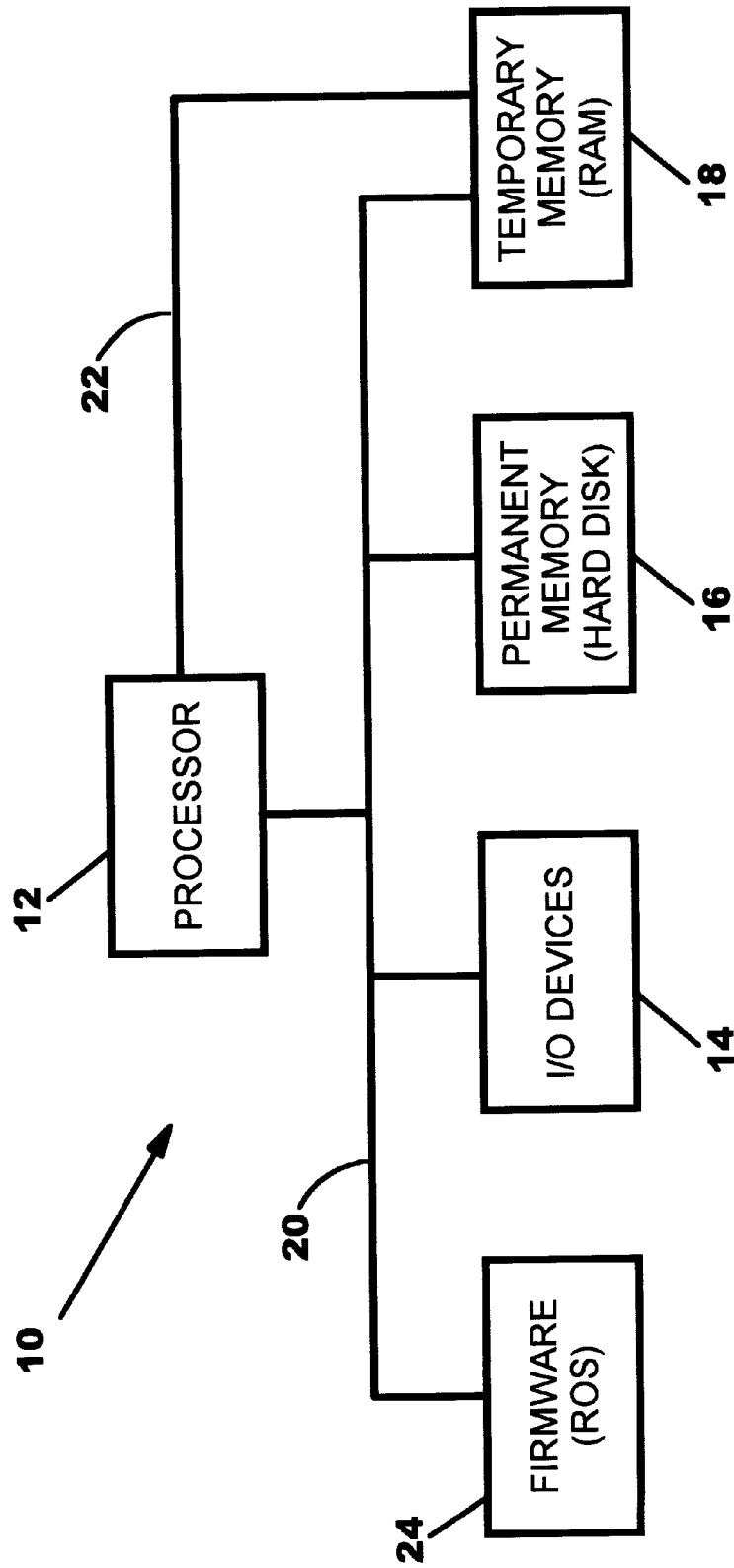
FIG. 1 is a block diagram of a conventional computer system.

The present invention is directed to a method of providing an indication of the progress of a task running in a computer system. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense.

With reference now to FIGS. 4–8, there are depicted several embodiments of pointer icons used in accordance with the present invention. Each of these icons is used as a pointer for a display device, i.e., a video monitor (such as a CRT or LCD panel). In the preferred implementation, another (default) pointer design, such as an arrowhead (not shown), is used by the graphical user interface (GUI) when the processor is idle (in the sense that no lengthy task is currently underway), or when only very short duration tasks are being processed. When longer tasks are undertaken, one of the icon series shown in FIGS. 4–8 may be used.

Figure 2C:
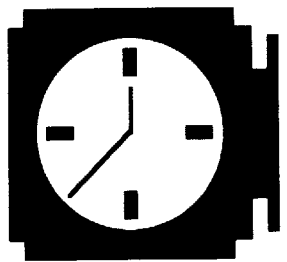
FIGS. 2A–2C are depictions of pointer icons as used in prior-art graphical user interfaces.
Figure 2B:
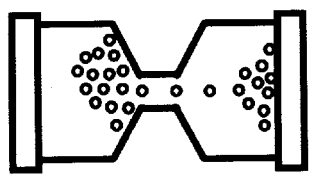
Figure 2A:
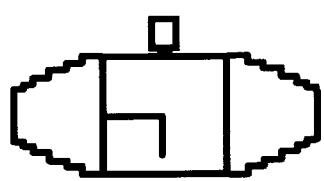
Figure 3:
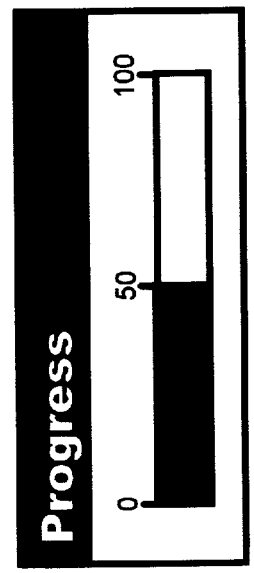
FIG. 3 is an illustration of an informational window that is used in prior-art computer systems to indicate the progress of a task.

Each of the FIGS. 4–8 depicts three different embodiments of the icons designed in accordance with the present invention, showing different versions of those icons depending upon the stage of progress of the task at hand. In each of these embodiments, the icons change as the task progresses, controlled by appropriate program instructions residing in the computer's processor. The exemplary icons depicted are variations of the prior-art (non-progress-indicating) icons of FIGS. 2A–2C. FIGS. 4A–4C depict three icons which are used when a the task is approximately 25% complete. FIG. 4A shows how a wristwatch icon may fill in a portion of the watch face in a clockwise fashion; that is, for the 25% stage, in a sector defined by the center of the watch face, the 12 o'clock position (i.e., extending vertically from the center), and the 3 o'clock position (i.e., extending horizontally from the center, to the right). FIG. 4C similarly depicts how a clock face can gradually be filled in, in approximate proportion to the amount of the task that has been completed. FIG. 4B shows application of the present invention to an hourglass icon, wherein progress is indicated by sand "granules" falling through the narrow portion of the hourglass, i.e., progress is indicated by the relative amount of granules shown in the upper half of the hourglass versus the amount of granules shown in the lower half of the hourglass.

Figure 5C:
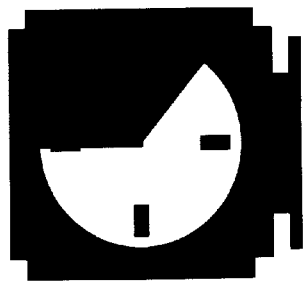
FIGS. 5A–5C are depictions of several embodiments of pointer icons used in accordance with the present invention, to indicate that a task is approximately 33% complete.
Figure 4C:
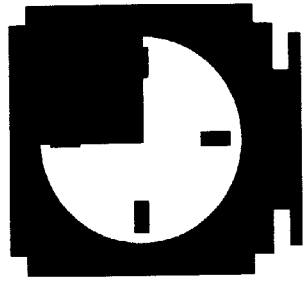
FIGS. 4A–4C are depictions of several embodiments of pointer icons used in accordance with the present invention, to indicate that a task is approximately 25% complete.
Figure 5B:
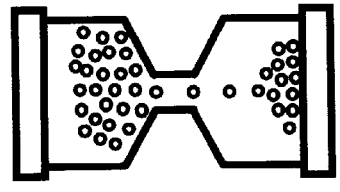
Figure 4B:
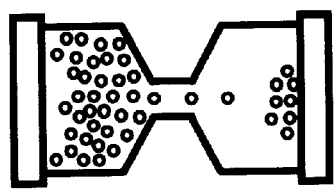
Figure 5A:
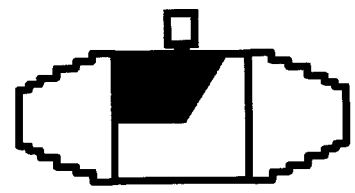
Figure 4A:
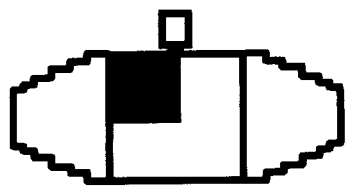

FIGS. 5A–5C depict three icons after the task is about 33% complete. FIGS. 6A–6C depict the same three icons after the task is approximately 50% (halfway) complete. FIGS. 7A–7C depict the three icons after the task is about 66% complete. FIGS. 8A–8C depict three icons after the task is about 75% complete. It can be seen that, in each of these designs, the change in the presentation of the icon indicates that the task has progressed further, i.e., by having the wristwatch or clock face fill in further, or by depicting more sand granules in the lower half of the hourglass (as they are emptied from the upper half). Other progress-indicating icons will become apparent to those skilled in the art upon reference to this disclosure. For example, an icon of a hand beginning as a fist could show fingers unfolding as the task progresses. Also, any icon could be filled in with a color, e.g., even the common arrowhead icon could be filled in from end-to-end (white to black) as the task progresses. The invention could also be extended to non-GUI displays. For example, a text-only screen (such as a DOS screen) could indicate progression of a task by providing a cursor block which is gradually filled in (e.g. from bottom to top, filling in the 14 scan lines available for a DOS character), or which is altered by changing its brightness (using the same character with different levels of gray shading).

It is preferable to update a dynamic progress-marking pointer icon without consuming an undue amount of system resources. For these pointers, that is, indeed, the case. In most display systems, each pointer is described by a 32-by-32 array of elements or pixels (a bitmap), each pixel of a designated color. The complete array can thus be defined by about one or two thousand bytes. To change the pointer shape, it is merely necessary to indicate to the operating system the location of a different bitmap, a relatively inexpensive task in terms of CPU resources. In fact, it is common practice to change the bitmap today, either when the active task is changed or based on the context of the current task. The dynamic pointer would similarly change shape based on an output of the current task which indicates its stage of progress. The progress-indicating pointer may be provided in response to program instructions from the operating system itself or from the application software.

To analyze the complete resource impact of changing pointers, consider the exemplary cost of using the hourglass. The hourglass icon is thirty-two elements high, including the icon frame and the portion of the icon depicting its bases. The portion of the hourglass height available for progress depiction is twenty elements high; that is, the hourglass can indicate progress in 5% increments. Therefore, in this embodiment, there will be twenty bitmaps, or about twenty- to forty-thousand bytes required for storage, a modest amount in today's operating systems. Furthermore, the update operation is inexpensive, involving a small update twenty times during task duration. For short tasks, the programmer may elect to use fewer updates, indicating progress in 10%, 20%, or 50% increments. Using a 32 element wide or high icon will generally result in no more than 32 bitmaps.

The present invention achieves the goals of providing an intuitive but non-intrusive indicator which takes the form of a pointer whose appearance changes as the task progresses. The invention provides a non-distracting, resource-sparing indicator that visually informs the user how much of the task is complete.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of indicating a state of progress of a task being processed in a computer system, comprising the steps of:

using a visual pointer provided in a graphical user interface of the computer system to provide a progress-indicating visual pointer, to indicate how much of the task is completed, on a display device of the computer system; and dynamically changing an appearance of the progress-indicating visual pointer based on a state of progress of the task being processed by the computer system wherein the progress-indicating pointer is a wristwatch icon, and said step of dynamically changing the appearance of the progress-indicating visual pointer includes the step of filling in a face of the wristwatch icon in an amount proportionate to the state of progress of the task being processed.

2. A method of indicating a state of progress of a task being processed in a computer system, comprising the steps of:

using a visual pointer provided in a graphical user interface of the computer system to provide a progress-indicating visual pointer, to indicate how much of the task is completed, on a display device of the computer system; and dynamically changing an appearance of the progress-indicating visual pointer based on a state of progress of the task being processed by the computer system wherein the progress-indicating pointer is a clock icon, and said step of dynamically changing the appearance of the progress-indicating visual pointer includes the step of filling in a face of the clock icon in an amount proportionate to the state of progress of the task being processed.

3. A method of indicating a state of progress of a task being processed in a computer system, comprising the steps of:

using a visual pointer provided in a graphical user interface of the computer system to provide a progress-indicating visual pointer, to indicate how much of the task is completed, on a display device of the computer system; and dynamically changing an appearance of the progress-indicating visual pointer based on a state of progress of the task being processed by the computer system wherein the progress-indicating pointer is an hourglass icon, and said step of dynamically changing the appearance of the progress-indicating visual pointer includes the step of filling in a portion of the hourglass icon in an amount proportionate to the state of progress of the task being processed.

4. A method of indicating a state of progress of a task being processed in a computer system, comprising the steps of:

using a visual pointer provided in a graphical user interface of the computer system to provide a progress-indicating visual pointer, to indicate how much of the task is completed, on a display device of the computer system; and dynamically changing an appearance of the progress-indicating visual pointer based on a state of progress of the task being processed by the computer system wherein the progress-indicating pointer is a wristwatch icon, and said step of dynamically changing the appearance of the progress-indicating visual pointer includes the step of filling in a face of the wristwatch icon, in a clockwise fashion, in an amount proportionate to the state of progress of the task being processed.

5. A method of indicating a state of progress of a task being processed in a computer system, comprising the steps of:

using a visual pointer provided in a graphical user interface of the computer system to provide a progress-indicating visual pointer, to indicate how much of the task is completed, on a display device of the computer system; and dynamically changing an appearance of the progress-indicating visual pointer based on a state of progress of the task being processed by the computer system wherein the progress-indicating pointer is a clock icon, and said step of dynamically changing the appearance of the progress-indicating visual pointer includes the step of filling in a face of the clock icon, in a clockwise fashion, in an amount proportionate to the state of progress of the task being processed.

6. A method of indicating a state of progress of a task being processed in a computer system, comprising the steps of:

using a visual pointer provided in a graphical user interface of the computer system to provide a progress-indicating visual pointer, to indicate how much of the task is completed, on a display device of the computer system; and dynamically changing an appearance of the progress-indicating visual pointer based on a state of progress of the task being processed by the computer system wherein the progress-indicating pointer is an hourglass icon, including an upper portion and a lower portion and said step of dynamically changing the appearance of the progress-indicating visual pointer includes the step of filling in a portion of the hourglass icon in an amount proportionate to the state of progress of the task being processed wherein said filling step fills in the lower portion with a plurality of granules while emptying granules from the upper portion.

7. A computer system comprising:

a processor;

a display device connected to said processor;

a graphical user interface residing in the processor, said graphical user interface operatively providing at least one visual pointer that displays a different shape indicating that a task is in progress on the display device;

a pointer device, connected to said processor, for manipulating the visual pointer on said display device; and instruction set residing in said processor for using said visual pointer to provide a progress-indicating visual pointer indicating how much of a task is completed, and dynamically changing an appearance of said progress-indicating visual pointer based on a state of progress of a task being processed by said processor wherein said instruction set provides said progress-indicating pointer in the form of a wristwatch icon having a face which is filled in an amount proportionate to said state of progress of said task being processed.

8. A computer system comprising:

a processor;

a display device connected to said processor;

a graphical user interface residing in the processor, said graphical user interface operatively providing at least one visual pointer that displays a different shape indicating that a task is in progress on the display device;

a pointer device, connected to said processor, for manipulating the visual pointer on said display device; and instruction set residing in said processor for using said visual pointer to provide a progress-indicating visual pointer indicating how much of a task is completed, and dynamically changing an appearance of said progress-indicating visual pointer based on a state of progress of a task being processed by said processor wherein said instruction set provides said progress-indicating pointer in the form of a clock icon having a face which is filled in an amount proportionate to said state of progress of said task being processed.

9. A computer system comprising:

a processor;

a display device connected to said processor;

a graphical user interface residing in the processor, said graphical user interface operatively providing at least one visual pointer that displays a different shape indicating that a task is in progress on the display device;

a pointer device, connected to said processor, for manipulating the visual pointer on said display device; and instruction set residing in said processor for using said visual pointer to provide a progress-indicating visual pointer indicating how much of a task is completed, and dynamically changing an appearance of said progress-indicating visual pointer based on a state of progress of a task being processed by said processor wherein said instruction set provides said progress-indicating pointer in the form of an hourglass icon having a portion which is filled in an amount proportionate to said state of progress of said task being processed.

* * * * *